United States Patent [19]

Miller

[11] 4,218,614
[45] Aug. 19, 1980

[54] DEVICE FOR MEASURING VIBRATION AMPLITUDE

[75] Inventor: Robert C. Miller, Penn Hills, Pa.

[73] Assignee: Westinghouse Electric Corp., Pittsburgh, Pa.

[21] Appl. No.: 913,774

[22] Filed: Jun. 8, 1978

[51] Int. Cl.$^2$ ............................................. G01D 5/34
[52] U.S. Cl. ................................. 250/231 R; 73/655
[58] Field of Search ....................... 250/231 R, 237 G; 73/651, 653, 654, 655, 656, 657

[56] References Cited

U.S. PATENT DOCUMENTS

| 2,214,910 | 9/1940 | Potts | 250/231 R |
| 2,351,955 | 6/1944 | Graf | 250/231 R |
| 2,447,863 | 8/1948 | Kent et al. | |
| 2,666,650 | 1/1954 | MacDonell | 250/231 R |
| 2,873,103 | 2/1959 | Hautly | 73/653 |
| 3,093,743 | 6/1963 | Inderwicsen | |
| 3,224,279 | 12/1965 | Galli et al. | |
| 3,364,813 | 1/1968 | McKinney | 73/655 |
| 3,394,976 | 7/1968 | Hawkins | |
| 3,789,674 | 2/1974 | Anderson et al. | |
| 3,961,185 | 6/1976 | Brokenshire | |

Primary Examiner—David C. Nelms
Attorney, Agent, or Firm—Gary E. Ross

[57] ABSTRACT

A device is provided for measuring the amplitude of vibration of a vibratory element. The vibratory element or reed has a vane attached to it extending between opposed fiber optics light guides. The vane has a mask portion which has slits forming alternating light-transmitting elements and opaque elements uniformly spaced in the direction of movement of the vane and lying in the path of light between the light guides. One of the light guides has a stationary mask with at least one slit corresponding in size and orientation to those of the vane. When light is transmitted from one of the light guides to the other while the vibratory member is vibrating, the light must pass through the slits of the masks and is alternately transmitted and cut off. By counting the number of minimum light transmissions, therefore, the amplitude of the vibration can be determined.

11 Claims, 6 Drawing Figures

DEVICE FOR MEASURING VIBRATION AMPLITUDE

BACKGROUND OF THE INVENTION

The present invention relates to a device for measuring vibration which is particularly useful for monitoring the operation of electrical equipment, although its usefulness is obviously not limited to this particular application.

In many instances, it is desirable to detect the occurrence of vibration and measure its amplitude, and to transmit the measurement to a remote location. In electrical equipment such as large generators, for example, it is desirable to monitor the machine to detect the occurrence of abnormal vibration in the stator windings, the stator core, or other parts of the machine. Fiber optics light guides provide a very desirable means for transmitting this information since they consist of glass fibers, which are insulating and are not affected by high voltages, magnetic fields, high temperature, or other environmental influences to which they may be subjected. It has been proposed heretofore to measure vibration by the use of such light guides. Two fiber optics light guides have been used for this purpose, one serving as a light source which transmits light to the point of measurement and the other light guide being a receiver and transmitting the information to a remote location. The two light guides are arranged so that light from the source is received by the receiver, and a vibrating member, or a vane attached to such a member, is placed in position to extend across the light path between the source and the receiver in such a manner that movement of the vane varies the amount of light received by the receiver which can be transmitted to a remote location. Measurement of the amount of light thus received can be used to determine the occurrence and amplitude of the vibration.

Various devices of this general type are known and may be arranged so that the light transmitted from the light source either crosses the path of a moving vane or is reflected from the vane into the receiving light guide. In either case, the amount or intensity of light transmitted by the receiving light guide is determined, usually by converting it to an electrical signal, and can be used as an indication of the amplitude of movement of the vane. Such a system, however, has serious limitations. Thus, it can be used only to measure amplitudes which are comparable to the diameter of the light guide. A more serious deficiency of such a system is that any change in the intensity of the light source from which the light signal is obtained, or in the sensitivity of the electrical detection means, or in the optical transmission characteristics of the light guides, results in a change in the amount of observed light and thus causes an erroneous measurement.

SUMMARY OF THE INVENTION

In accordance with the present invention, a vibration measuring device is provided utilizing fiber optics light guides to obtain a digital output signal from which the vibration amplitude can be determined, and which is independent of variations in the light intensity, transmissivity of the light guides, and other such variables.

For this purpose, a vibratory reed or similar element is provided which is excited into vibration by a member to be monitored and which has a vane attached to its free end. Two fiber optics light guides are provided, one of which serves as a light source and the other as a receiver. The two light guides are placed in opposed positions with the vane extending across the light path between the source and the receiver. The vane carries or includes a mask having alternating light-transmitting elements and opaque elements which preferably consist of elongated slits separated by solid portions and extending transversely of the light path. The slits are uniformly spaced in the direction of movement of the vane, and a second stationary mask is placed over the receiver light guide. The stationary mask has at least one slit corresponding in size and orientation to the slits in the movable mask. Vibration of the reed, therefore, causes the mask on the vane to move transversely of the light path in such a manner that the slits in the moving mask coincide alternately with the stationary slit and with the solid portion of the stationary mask. A series of light pulses is thus transmitted to the receiver as the light received varies from a maximum to a minimum which is essentially zero. The receiver light guide may extend to a desired remote location and is provided with any suitable means, preferably an electrical detecting system, for counting the number of light transmission minima in a given time. The amplitude of the vibration can then be readily determined from the known dimensions and spacing of the slits in the masks. It will be seen that since this system depends only on counting the number of occurrences of minimum transmitted light, it provides a digital output which is independent of variations in the amount or intensity of light received.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
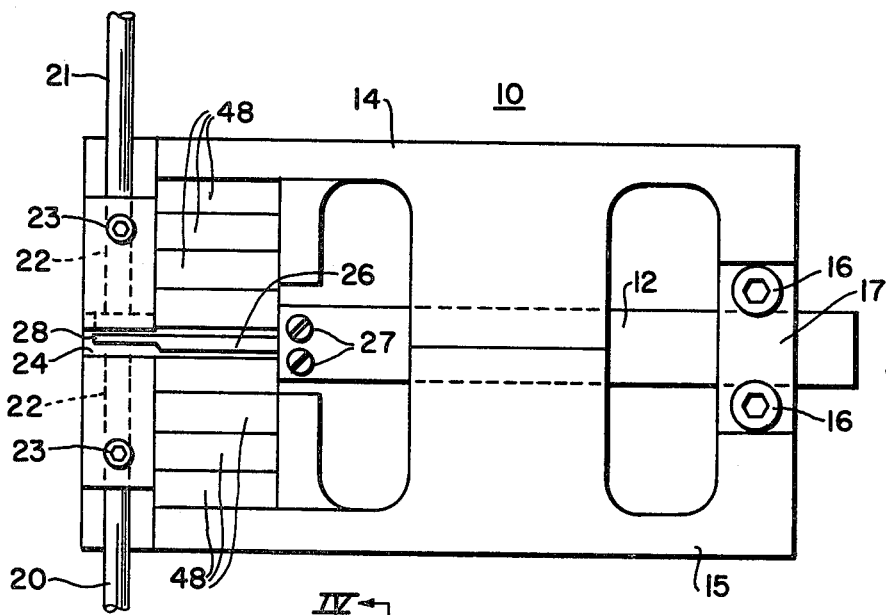
FIG. 1 is a top view of a vibration measuring device embodying the invention.

The invention is shown in the drawing in an illustrative embodiment in a vibration measuring device 10. The device 10 includes a vibratory member, shown as a vibrating reed 12, enclosed in a container consisting of two side members 14 and 15 which together form a generally rectangular box or enclosure. The side members 14 and 15 may be made of aluminum or other suitable material and may be held together by means of screws or in any desired manner. The reed 12 is preferably made of phosphor bronze, although it could be made of any suitable material, and one end of the reed is clamped in the container by means of screws 16 and a clamping member 17. Thus, when the device 10 is attached to a member which is to be monitored, so as to be subjected to any vibration that may occur, the reed 12 will be excited into vibration through the container, and its free end will vibrate with an amplitude and frequency determined by the resonant and mechanical characteristics of the reed itself and the frequency of the applied vibration.

In order to measure the vibration, and to transmit the information obtained to a remote location, fiber optics light transmission means are utilized. A light guide 20 is provided to serve as a light source for the device 10, and a similar light guide 21 serves as a receiver. The light guides 20 and 21 are fiber optics members of well known type consisting of one or more glass fibers of suitable size adapted to transmit light with negligible loss. The light guides 20 and 21 are received in openings 22 in the side members 14 and 15, respectively, and held in place by set screws 23. The end portions of the members 14 and 15 are recessed at the end opposite the clamping member 17 to form a narrow slot 24 between them. The openings 22 extend through the ends of the respective members 14 and 15 to the slot 24 and the light guides 20 and 21 are thus held in alignment with their ends spaced apart at least by the width of the slot 24.

Figure 3:
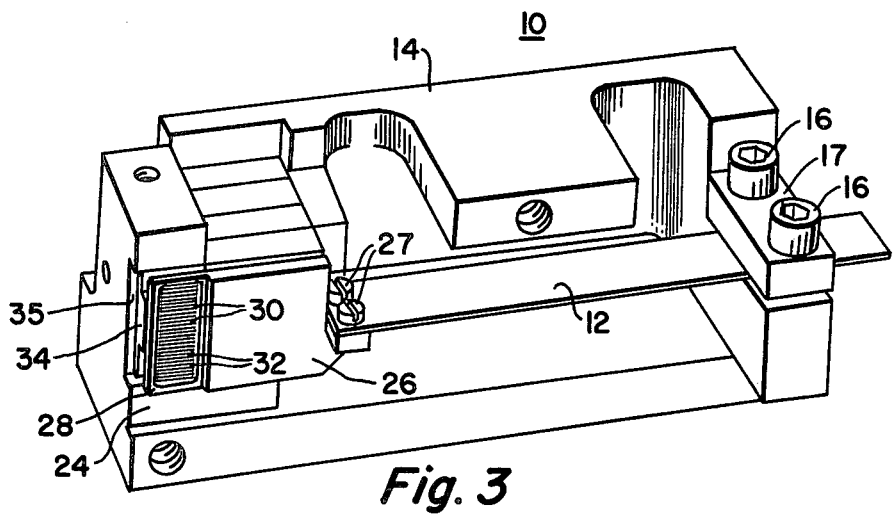
FIG. 3 is a side view of the interior of the device, one of the side members being omitted.

A vane 26 is attached to the end of the vibrating reed 12 by screws 27, or other suitable means, and extends into the slot 24 across the light path between the light guides 20 and 21. The vane 26 may be made of aluminum, or other suitable material, and extends generally transversely to the vibrating reed 12 so that as the reed vibrates, the vane moves vertically up and down in the slot 24. The vane 26 carries a mask portion 28 which in the preferred embodiment shown in the drawing is integral with the vane itself. The mask 28 can be seen in FIG. 3 and has a plurality of alternating light-transmitting elements and opaque elements which extend transversely of the direction of movement of the reed 12. In the preferred embodiment, the light-transmitting elements are formed by a plurality of elongated slits 30 in the mask 28 which are transverse to the direction of movement of the vane and extend across the light path between the light guides 20 and 21. The opaque elements 32 consist of the solid portions of the vane between the slits. The widths of the slits 30 and of the opaque portions 32 are made substantially equal, so that the slits are uniformly spaced apart vertically, and a substantial number of slits is provided extending from top to bottom of the vane.

Figure 2:
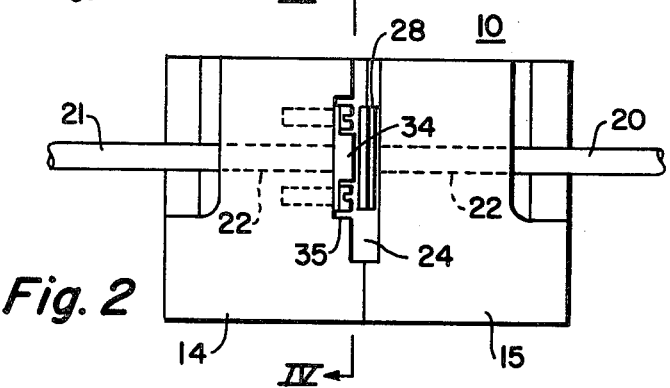
FIG. 2 is an end view of the device of FIG. 1.
Figure 4:
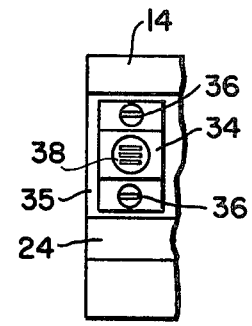
FIG. 4 is a fragmentary view on the line IV-IV of FIG. 2.

A stationary mask 34 extends across the end of the receiver light guide 21. The mask 34 is placed in a recess 35 at one side of the slot 24 and secured in place by screws 36. As shown in FIG. 4, the stationary mask 34 may have three slits 38 separated by opaque portions of the mask. The slits 38 are of the same dimensions and spacing as the slits 30 and are similarly oriented. Three slits 38 are used in the stationary mask in the illustrative embodiment but it will be understood that any number of slits, either more or less, could be utilized depending on the size of the slits and the diameter of the light guide 21. The stationary mask 34 is positioned over the receiving light guide 21 as shown in FIG. 2 in such a position that the slits extend across the end of the light guide so that light must pass through the slits to reach the light guide. The mask 34 is positioned so that the slits 38 are in alignment with the slits 30 in the mask 28 and parallel to the slits 30. It will be seen, therefore, that if the reed 12 is stationary with the slits in the masks 28 and 34 coinciding in position, light transmitted through the light guide 20 will pass through both masks to the receiving light guide 21. If the reed 12 is excited into vibration, however, the mask 28 moves vertically with the reed and the slits 38 in the mask 34 are aligned alternately with the slits 30 in the mask 28 and with the opaque portions 32 of the mask. The amount of light reaching the guide 21, therefore, will vary between a maximum and a minimum, which is essentially zero, as the slits move into and out of alignment. The number of light minima thus occurring during one excursion of the end of the reed is a measure of the amplitude of the excursion.

Figure 5:
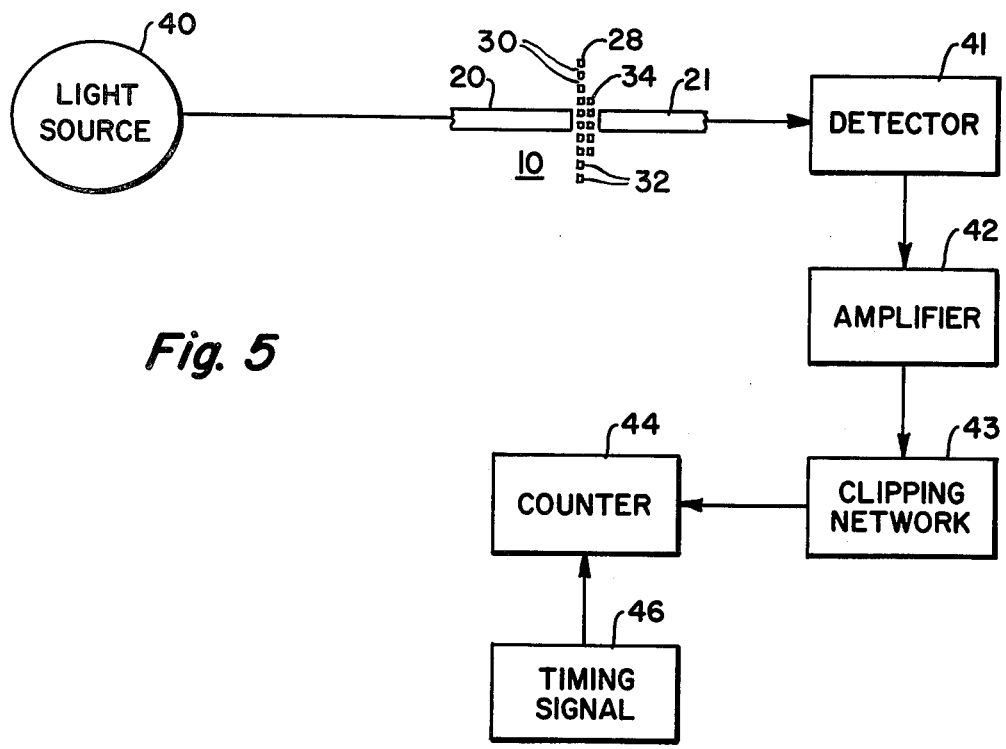
FIG. 5 is a schematic diagram illustrating the complete system.

The complete system is shown diagrammatically in FIG. 5. As there shown, a light source 40 of any suitable type is provided at a remote location and light from the source is transmitted to the device 10 through the light guide 20. The light guides 20 and 21 are placed in opposed positions, as described above, with their ends in alignment and spaced apart. The moving and stationary masks 28 and 34 extend across the space between the two light guides, so that the light from the source light guide 20 passes through the slits in the screens to the receiving light guide 21 for transmission to a remote location.

The width of the slits in the masks is made relatively small, compared to the expected amplitude of vibration of the reed 12, so that as the reed vibrates and the slits 30 and 38 move into and out of coincidence, the light is transmitted through the masks from the light source 30 to the light receiver 21 in a series of pulses, varying from maximum to minimum light intensity and a substantial number of such pulses occur during each excursion of the reed. The number of light minima is directly related to the amplitude of the excursion, and the amplitude of vibration, therefore, can be determined by counting the number of occurrences of minimum transmission of light through the masks from the light source 20 to the receiver 21 in a time corresponding to the period of the vibration.

This counting may be done in any suitable manner, preferably at a remote location, and FIG. 5 shows a simple system for doing this electrically. The light pulses received through the light guide 21 are applied to a detector 41, such as a PIN diode, which converts the light pulses to corresponding electrical signals which are amplified in an amplifier 42 and fed to a clipping network 43. The output of the network 43 is a square wave of constant amplitude consisting of pulses corresponding to the light pulses transmitted through the light guide 21. This wave is applied to a counter 44 which counts the number of pulses, preferably by counting the zero crossings of the square wave. A timing signal 46 is also preferably supplied to the counter 44 to gate it ON for a preset period of time so that the counter will register the number of light minima in the preset time interval.

Figure 6:
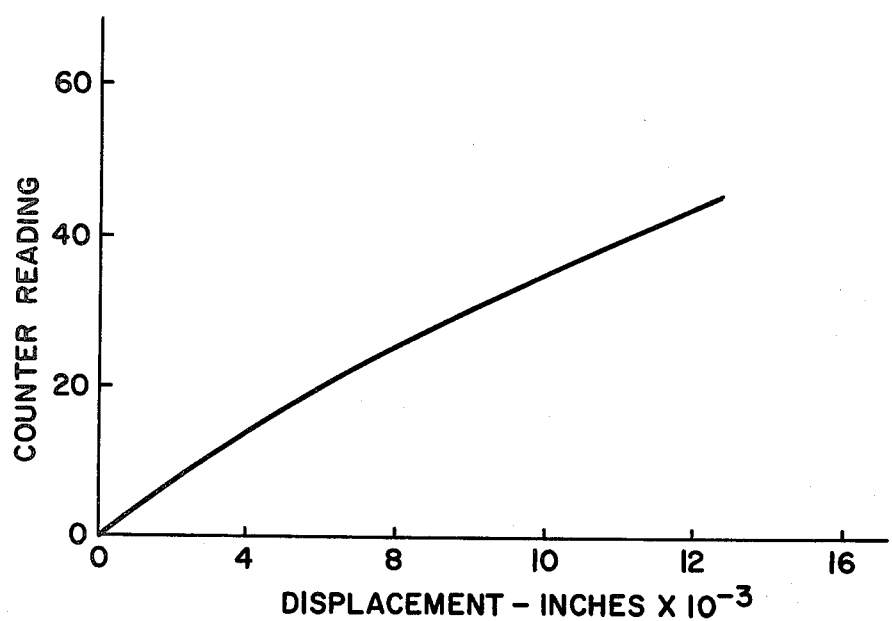
FIG. 6 is a typical calibration curve for the system of FIG. 5.

In most applications of the device 10, the frequency of the vibration to be measured will be known, either exactly or to a close approximation. Thus, if the device 10 is used for monitoring the vibration of core or conductors of a large generator or transformer, for example, the frequency of the vibration will be very close to 120 hertz and the timing signal can be set accordingly. In this case, the number of light minima is counted during an interval of 1/120 of a second, which is the period of one complete cycle of vibration, and is directly related to the amplitude of vibration. Since the spacing and width of the slits in the two masks is known, the amplitude can be exactly determined. A typical calibration curve for the device 10 is shown by way of example in FIG. 6. As there shown, the reading of the counter 44 is plotted against the corresponding displacement of the vane 26 in thousandths of an inch. The variation of this curve from a straight line is attributable to a slight change in the mechanical amplification characteristics of the reed as a function of amplitude. It will be seen that with such a calibration curve, the reading of the counter 44 can be interpreted directly to show the amplitude of vibration of the reed and thus to indicate the magnitude of vibration, or a change in vibration, of a member on which the device 10 is mounted. It is not actually necessary to know the frequency of the vibration since the frequency can be determined from the output of the clipping network 43 as a function of time. That is, the time interval between pulses varies during one period of the vibration so that the time of a half-period, or the frequency, can easily be determined. It is thus easily possible to monitor at a remote location the vibration occurring in a large generator, for example, or any other device which it is desired to monitor. The device is particularly useful for electrical equipment since the device 10 itself can be made of either metallic or non-metallic materials, and the light guides 20 and 21 consist of glass fibers which are inherently insulating and which are not affected by electrical fields, magnetic fields, or other adverse environmental influences.

The sensitivity of the device is affected by the resonance characteristics of the reed 12 which is influenced by the material used which can be phosphor bronze or a nonconducting material such as fused silica or alumina, if desired. The sensitivity depends on the mechanical charcteristics of the material and the dimensions of the reed itself and is related to the spacing of the slits in the masks which may be made quite small. If the sensitivity is greater than is required for a particular application, damping can be provided by permanent magnets 48 disposed in the device 10 on each side of the vane 26, if the vane is made of a conducting material such as aluminum. The magnets 48 cause currents to be induced in the vane which react with the magnetic field to provide the desired damping forces. Damping can also be provided in other ways if desired. Thus, if the presence of a magnetic field in the device is undesirable, or if the vane cannot be made of conducting material for any reason, viscous damping can be provided by filling the container formed by the members 14 and 15 with a suitable liquid. As another alternative, the reed can be tuned to a natural resonant frequency which is sufficiently different from the applied frequency to reduce the amplitude of vibration to the extent desired.

It will be apparent that various modifications and other embodiments are possible. Thus, it is not necessary for the light guides to be in opposing positions on opposite sides of the vane 26. The light guides could be placed on the same side of the vane and the mask 28 could have alternating reflective and non-reflective elements instead of the slits 30. The light reflected from one light guide to the other would then vary from a maximum to a minimum and the number of minima could be counted to determine the amplitude of vibration in the manner described.

What is claimed is:

1. In combination, a vibratory member adapted to be excited into vibration, a vane attached to said vibratory member for movement therewith, a light source, a light receiver, said light source and light receiver being positioned for transmission of light from the source to the receiver, the vane including a portion extending into the light path between the source and receiver and said portion having a plurality of elements for directing light to the receiver and light-absorbing elements alternating with each other and extending transversely of the direction of movement of the vibratory member and uniformly spaced in said direction, a stationary mask covering the light receiver and having at least one light-transmitting element of the same size and orientation as the light-directing elements of the vane, and said light-receiving means including counter means for counting the number of occurrences of minimum light transmission to the light-receiving means.

2. The combination of claim 1 in which said light source and said light receiver are positioned on opposite sides of said vane, and the vane includes a mask portion extending across the light path between the source and the receiver, said mask portion having alternating light-transmitting elements and opaque elements.

3. The combination of claim 2 in which both said masks are opaque and the light-transmitting elements are elongated slits separated by solid portions of the mask, the slits and solid portions being of the same width.

4. The combination of claim 3 and including damping means for limiting the maximum amplitude of vibration of said vibratory member.

5. The combination of claim 4 in which the vane is made of metal and the damping means comprises at least one permanent magnet positioned to induce eddy currents in the vane.

6. The combination of claim 1 in which said light-receiving means includes detector means for converting light signals to electrical pluses, and means for counting said pulses to determine the number of occurrences of minimum light transmission to said receiving means.

7. A vibration measuring system comprising:
(a) a vibratory reed, said reed responsive to the vibrations to be measured, said reed having a free end and a fixed end;
(b) a vane attached to the free end of said reed, said vane including a movable mask having alternating light transmitting elements and opaque elements;
(c) a source light guide, disposed to transmit light to said vane;
(d) a receiver light guide, disposed to transmit light from said vane;
(e) a stationary mask disposed between said vane and said receiver light guide, said stationary mask having at least one light transmitting element; and
(f) means for counting the pulses of light transmitted by the receiver light guide;
(g) whereby each vibration of the reed causes the mask on the vane to move across a light path between the light guides in such manner as to alternately align the light transmitting elements and the opaque elements of the movable mask with the light transmitting element of the stationary mask, thereby causing a plurality of pulses to be transmitted to the counter during a predetermined period of time, said number of pulses related to the amplitude of vibration.

8. The vibration measuring system of claim 7 wherein the light transmitting elements in the movable mask comprise a plurality of elongated slits; the opaque elements in the movable mask comprise the spaces between the slits, and the light transmitting element in the stationary mask is an elongated slit having the same size and orientation as the slits in movable mask.

9. The vibration measuring system of claim 7 wherein the counting means comprises:
(a) means for converting the light pulses, transmitted by the receiver light guide, into electrical signals;
(b) means for amplifying the electrical signals;
(c) a clipping network, said network having an output comprising a plurality of pulses of constant amplitude; and
(d) means for counting the number of said pulses during a predetermined period of time.

10. The device of claim 1 in which said light source and said light receiver are positioned on the same side of said reed.

11. The device of claim 1 or 10 wherein said light directing elements in said vane are reflective.

* * * * *